Patented July 13, 1954

2,683,739

UNITED STATES PATENT OFFICE 2,683,739

PROCESS FOR THE CRYSTALLIZATION OF L-GLUTAMIC ACID

Samuel H. Weidman, Los Gatos, Calif., assignor to International Minerals & Chemical Corporation, a corporation of New York No Drawing. Application March 3, 1952, Serial No. 274,650

23 Claims. (Cl. 260—527)

This application is a continuation-in-part of application Serial No. 102,938, filed July 2, 1949, now abandoned.

The present invention relates to a process for the production of glutamic acid. More particularly, this invention relates to a process for the production of granular, free flowing, anhydrous crystals of glutamic acid.

There are several well known methods for producing glutamic acid. Glutamic acid is produced from raw materials which yield it upon hydrolysis. This class of raw materials will be referred to herein as "glutamic acid mother substances," and include materials from which glutamic acid can be formed, such as vegetable proteins, animal proteins, wheat gluten, casein, and the like, as well as beet molasses, Steffen's filtrate, and the like.

The hydrolysis of glutamic acid mother substances may be carried out in any suitable manner, either under acid or alkaline conditions. If the hydrolysis is carried out with a mineral acid, such as hydrochloric acid, and a solution containing glutamic acid hydrochloride is obtained, glutamic acid can be crystallized from the solution by adjusting the pH of the solution to about 3.2.

From an economical stand point, the most practical starting material is wheat gluten or Steffen's filtrate. Ordinarily the glutamic acid prepared is not of a pharmaceutical grade and is frequently converted to monosodium glutamate by the addition of sodium hydroxide. Monosodium glutamate when substantially purified, finds wide use in the food industry. It is sometimes desirable however, to produce glutamic acid having a high degree of purity. This is frequently done by first converting crude glutamic acid into monosodium glutamate and the monosodium glutamate, which is readily soluble in water, is decolorized and purified. After purification, the monosodium glutamate can be converted back to glutamic acid by the addition of hydrochloric acid. It is then crystallized at its isoelectric point.

When crude or purified glutamic acid is crystallized at its isoelectric point, that is, a pH of about 3.2, for example, by adjusting the pH of an acidic hydrolysate with sodium hydroxide or by adjusting the pH of a monosodium glutamate-containing solution with hydrochloric acid, the adjusted mixture is filtered or centrifuged, and the glutamic acid cake is washed with water in order to remove water soluble impurities. Difficulty is encountered at this point, because on centrifuging, the crystalline glutamic acid ordinarily packs into a hard cake and contains considerable mother liquor. The use of relatively large amounts of water is required to reduce the salt content of the cake to an acceptable value. The crystalline cake of glutamic acid is likewise difficult to remove from the centrifuge due primarily to the inherent shape of the glutamic acid crystals formed in the previously described process. The crystals are fragile, elongated plates or needles and are classed as belonging to the orthorhombic system. These crystals also have a tendency to fracture into irregular fragments, and when handled in relatively large quantities, considerable dust results which constitutes an explosion hazard as well as creating undesirable working conditions.

While the crystals are anhydrous, the grouping together of large amounts in the presence of a relatively small amount of water, such as is supplied by washing in a centrifuge load of such crystals, causes the water to be retained in the cake and causes the cake itself to pack firmly against the walls of the centrifuge so that, as previously mentioned, considerable difficulty is experienced in removing the cake. This crystalline form of glutamic acid, after drying, is not free-flowing; and due to its needlelike form, much space is wasted in storing and shipping it in any sizable quantity as compared to the product produced by the instant novel process.

Crystalline glutamic acid is reported in the literature as belonging to the orthorhombic system, its crystalline habit varying somewhat depending upon the method of preparation. Keenan, in volume 62 of the "Journal of Biochemistry," pages 165 to 172 describes the glutamic acid crystals as orthorhombic tetrahedra. Other references report glutamic acid crystals as orthorhombic sphenoidal or rhombic bisphenoidal.

Crystalographic data for L-glutamic acid may be found in P. Grath's "Chemische Krystallographie," Tl. 3, page 407 (Leipzig 1910); Beilstein's "Handbuck Der Organischen Chemie," volume IV, page 490 (1922); and in A. N. Winchell's "Optical Properties of Organic Compounds," page 56 (University of Wisconsin Press, Madison, 1943). L-glutamic acid crystals are described as orthorhombic sphenoidal with linear axial constants of $a:b:c = 0.687:1:0.8551$, habit varied, sphenoidal, or short prismatic.

Birnal, in "Zeitscrift fur Kristallographie," volume 78, pages 363–9 (1931), reported the constants of the unit cell $a_0 = 7.06$ Angstrom units, $b_0 = 10.3$ Angstrom units, and $c_0 = 8.75$ Angstrom units.

As far as is known, the orthorhombic crystal of glutamic acid described in the aforementioned references is the stable modification obtained at about room temperature in the presence of its saturated aqueous solution, or of the mother liquor obtained in the preparation of glutamic acid from solutions containing monosodium glutamate. This orthorhombic crystal of glutamic acid is ordinarily manufactured when the amount of hydrochloric acid necessary to adjust a solution containing between about 20% and about 25% of monosodium glutamate to a pH of between about 3.0 and about 3.3 is slowly added to said solution with stirring, or it can also be prepared by first seeding a solution containing monosodium glutamate with the aforementioned crystals of glutamic acid and adjusting the pH with mineral acid to between about 3.0 and about 3.3. The latter process assures a product comprising essentially the orthorhombic type crystal referred to previously. The orthorhombic form of glutamic acid is crystallized in like manner from a solution of glutamic acid hydrochloride by the addition of caustic to obtain a pH of about 3.2.

In a continuous process in which hydrochloric acid and monosodium glutamate-containing solutions are slowly and simultaneously added to a large circulating body or slurry containing the stable orthorhombic crystal of glutamic acid, which by the continuous addition of monosodium glutamate solution and hydrochloric acid is held at a pH of between about 3.0 and about 3.3, the continued production and growth of this type of product is almost certain.

It would be desirable if a modification of this type of crystal of glutamic acid could be produced in order to overcome the above described difficulties experienced in centrifuging or filtering the glutamic acid crystals from the solutions and to obtain a form of glutamic acid having more desirable physical properties.

It is the principal object of this invention to produce a crystalline form of glutamic acid which is granular in form rather than platelike or needlelike.

It is a further object of the instant invention to produce a crystalline form of glutamic acid which possesses desirable characteristics of filtration and centrifugation, which packs well for shipping, and is resistant to powdering and dusting.

It is a further object of the instant invention to produce a novel form of crystalline glutamic acid comprising crystals which are monoclinic in form, having linear axial constants of $a:b:c = 0.703:1:1.422$, $\beta = 110°51'$, in which the unit cell of the crystal has the following properties: $a_0 = 6.18$ Angstrom units, $b_0 = 8.80$ Angstrom units and $c_0 = 12.50$ Angstrom units.

Further objects of the instant invention will become more apparent upon a more complete understanding of the invention as herein set forth.

It has been found that a monoclinic crystalline form of glutamic acid which is granular, free flowing, easily filtered and centrifuged, and which requires less space for packaging and shipping, may be produced by crystallizing the aforesaid monoclinic glutamic acid crystals from a solution of a hydrolyzed glutamic acid mother substance under the conditions herein described.

Monoclinic glutamic acid is crystallized from solutions, from which glutamic acid can ordinarily be crystallized by adjustment of the pH of the solution to the isoelectric point of glutamic acid, by making said pH adjustment under the conditions herein described.

The solutions from which glutamic acid are ordinarily crystallized by adjustment of the pH of the solution to the isoelectric point of glutamic acid contain a glutamic acid salt. By the term "glutamic acid salt" is meant a true salt as defined by Beilstein Organische Chemie, vol. 4, page 491, and includes monosodium glutamate and glutamic and hydrochloride in solution.

The type of glutamic acid crystal obtained by practicing the instant invention has been found to be metastable in its saturated aqueous solution or in the mother liquor of a glutamic acid slurry made by adjusting a monosodium glutamate-containing solution to a pH of between about 2.5 and about 4.0 with a nonoxidizing mineral acid such as hydrochloric acid, sulfuric acid and the like or made by adjusting a glutamic acid hydrochloride-containing solution to a pH of between about 2.5 and about 4.0 with a caustic solution such as, sodium hydroxide or potassium hydroxide or with a solution containing monosodium glutamate.

The term "metastable" as used in the description and claims, means glutamic acid crystals which when in contact with a saturated solution and in the presence of the stable orthorhombic crystal, will slowly dissolve and crystallize out as the stable orthorhombic form until, at equilibrium, only the stable orthorhombic form of crystal and saturated solution exist together.

Monoclinic glutamic acid having the aforementioned desirable properties is produced in accordance with the instant invention either from solutions containing monosodium glutamate or from solutions containing glutamic acid hydrochloride. These solutions may be prepared in any conventional manner from raw materials containing glutamic acid mother substances, such as, animal and vegetable proteins, concentrated Steffen's filtrate and the like by hydrolysis. The monoclinic glutamic acid may be crystallized from a crude hydrolysate or from prepared solutions.

In one embodiment of the instant invention, monoclinic glutamic acid is produced by adjusting the pH of an aqueous solution containing monosodium glutamate with concentrated mineral acid nonoxidizing under the conditions obtaining to between about 2.5 and about 4.0 under the conditions subsequently to be described. While it is preferred to use concentrated hydrochloric acid, any mineral acid nonoxidizing under the conditions obtaining may be employed. The term "nonoxidizing mineral acid" as herein used in the description and claims refers to mineral acid nonoxidizing under the conditions obtaining. The term "glutamic acid" as used in the description and claims refers to L-glutamic acid, that is, the glutamic acid having the natural optical rotation.

In another embodiment of the instant invention monoclinic glutamic acid crystals are formed by adjusting the pH of a solution containing glutamic acid hydrochloride to a pH of between about 2.5 and about 4.0. A solution containing caustic soda or a solution of monosodium glutamate is employed for this pH adjustment.

The instant novel process of crystallizing monoclinic glutamic acid is applicable to the crystallization of crude glutamic acid in the crude section of a glutamic acid refinery process as well as to the crystallization of substantially pure glutamic acid and from a solution from which impurities have been previously removed. Crystallizing glutamic acid in the monoclinic form in the crude section may be desirable because this form of crystal is much more easily filtered or centrifuged and is much easier to handle in the plant. For example, in a process for producing glutamic acid from concentrated Steffen's filtrate, the concentrated Steffen's filtrate is hydrolyzed with a caustic solution and adjusted to a pH of between about 5.0 and about 5.4. The adjusted solution is concentrated to crystallize inorganic salts therefrom. The concentrated solution is then filtered. The resulting crude solution is treated in accordance with the instant novel process to produce crude monoclinic glutamic acid crystals by adjusting the pH of the solution to between about 2.5 and about 4.0 with hydrochloric acid. The crude glutamic acid crystals which are monoclinic in form are easily filtered or centrifuged and are easily removed from the filters or centrifuges. These crude glutamic acid crystals can then be repulped with water, and the resulting mixture adjusted to a pH of about 6 with caustic. This adjusted solution is decolorized, and pure monoclinic glutamic acid is crystallized from this solution by adjusting the pH to between about 3 and about 4 with hydrochloric acid in accordance with the instant invention.

Among the important conditions which must be satisfied to produce the monoclinic type of crystal are the correct concentration of the hydrolyzed glutamic acid mother substance in the solution from which the glutamic acid is to be crystallized, the manner of acid or alkali addition to said solution, and the type of agitation or stirring of the resulting solution. These three conditions are related to each other; any one may be varied within limits and as hereinafter described.

It has been found that in the original production of monoclinic glutamic acid crystals, the most desirable concentration in aqueous solution of monosodium glutamate is between about 5% and about 25%, preferably between about 5% and about 15%. When the monoclinic glutamic acid crystals are to be produced from a solution containing glutamic acid hydrochloride, the concentration of glutamic acid hydrochloride in the solution should be between about 4% and about 30%, preferably between about 4% and about 20%.

Although it is preferred to adjust the aforesaid solutions to a pH of between about 3.0 and about 3.3, substantial amounts of monoclinic crystals are produced if the pH is adjusted to between about 2.5 and about 4.0.

To initially produce monoclinic crystals of glutamic acid, it is necessary to make the aforesaid pH adjustment at such a rate as to insure the formation of at least one monoclinic glutamic acid crystal nucleus, prior to the formation of any orthorhombic crystal nuclei. To accomplish this, it is preferred either to simultaneously mix the monosodium glutamate containing solution with sufficient concentrated hydrochloric acid to obtain a pH of between about 3.0 and about 3.3, or to admix the hydrochloric acid and monosodium glutamate-containing solution so that the volume of acid necessary to adjust the pH to the aforesaid range can be and is added within about thirty seconds, preferably within about twenty seconds. In preparing the monoclinic glutamic acid crystal from a solution containing glutamic acid hydrochloride, the alkali or monosodium glutamate solution should be mixed with the glutamic acid hydrochloride solution, preferably either substantially instantaneously or within about five seconds. However, the time in which the pH adjustment of the solution should be completed varies and depends upon the concentration of the solution and the type of agitation employed; the only limitation being that the pH adjustment be completed before orthorhombic crystals form.

If the preferred conditions are employed, substantially no crystals form for about twenty to about thirty seconds or longer after the completion of the pH adjustment. As previously stated, the aforesaid conditions of the rate of pH adjustment and concentration of the glutamic acid salt in the solution may be varied. At higher concentrations of the glutamic acid salt in the solution, for example, about 20% glutamic acid hydrochloride in solution, the pH adjustment should be made with agitation or rapid stirring. At higher concentrations, high supersaturations of glutamic acid are obtained and crystallization of both forms of crystals starts sooner. However, the metastable monoclinic crystals are those first visibly formed. To produce maximum yields of the monoclinic crystals, agitation must be such as to have these first-formed crystals act as seed crystals throughout the solution before the stable orthorhombic form appears in any substantial quantity. From then on, the solution is in effect seeded with monoclinic glutamic acid crystals, and with rapid agitation the seed crystals are scattered throughout the solution inducing maximum formation of this type of crystal.

As previously stated, the solution containing monosodium glutamate in concentration of between about 5% and about 25%, preferably about 10%, or a solution containing glutamic acid hydrochloride in concentration of between about 4% and about 30%, preferably about 10% is employed for the original production of monoclinic crystals of glutamic acid. This range of concentration has been found to yield the maximum percentage of monoclinic glutamic acid crystals. However, once a quantity of the monoclinic type of crystal has been obtained, it may be used to seed more concentrated solutions of the salts, that is, monosodium glutamate solutions up to about 40% and glutamic acid hydrochloride solutions up to about 40%, may be employed to produce greater yields of monoclinic crystals.

The monoclinic crystals to be used for seeding may be either separated from their mother liquor or used, without separation, in the form of a slurry. If they are to be stored before using, it is preferred to filter, wash, and dry them. The simplest method for using the seed crystals is to use the slurry containing these monoclinic crystals. The slurry is mixed with the solution from which the glutamic acid is to be crystallized. When the solution has been seeded with the metastable glutamic acid crystal, the pH is adjusted to between about 2.5 and about 4.0, preferably to between about 3.0 and about 3.3. One of the objects of seeding with the monoclinic crystal is to induce crystallization of this form of glutamic acid crystal in preference to the stable orthorhombic form of glutamic acid crystals. In addition maximum production is realized by seeding because higher concentrations in the solution may be employed. The previously described method for the original production of monoclinic crystals does not attempt maximum production, but provides for the facile production of monoclinic crystals.

The amount of seed crystal added is related to the rate of stirring of the mixture. To produce maximum yields of monoclinic type of crystals the rate and type of agitation should cause the quantity of seed used to be distributed throughout the entire body of solution in such a manner that there is a seed crystal at almost every point at which crystallization is likely to occur. When larger quantities of seed crystals are employed, the rate of agitation may be lessened.

By employing monoclinic crystals of glutamic acid to seed solutions from which glutamic acid is to be crystallized, a continuous process for the production of glutamic acid having the desirable crystal characteristics may be developed as hereinafter described.

The first step in a continuous process for the production of monoclinic crystals of glutamic acid is the original preparation of the same from a solution containing monosodium glutamate or from a solution containing glutamic acid hydrochloride. As previously mentioned the original preparation is more easily accomplished from relatively weak solutions, for example, monosodium glutamate solutions ranging between about 5% and about 25%, the preferable concentration being between about 10% and about 15%. A concentrated nonoxidizing acid, preferably hydrochloric acid is added with agitation to the solution containing monosodium glutamate, the quantity of acid being that required to permanently adjust the pH of the mixture to between about 3.0 and about 3.3. The acid is added either all at once or within a period of about thirty seconds; the stirring should be such as to insure thorough, rapid mixing of the acid and monosodium glutamate solution. Crystallization starts rather slowly when monosodium glutamate solutions of 10% or less are employed, but it begins more rapidly when higher concentrations of monosodium glutamate are employed. At the higher concentrations, much more rapid stirring is necessary, and the time required for the addition of the acid must be very short to obtain the desired product.

The original production of monoclinic glutamic acid crystals from glutamic acid hydrochloride-containing solutions is carried out by adding either sodium hydroxide or a solution containing monosodium glutamate to the hydrochloride solution. The concentration of the glutamic acid hydrochloride in the solution should be between about 4% and about 20%, preferably about 10%. The quantity of sodium hydroxide or monosodium glutamate solution added is that required to permanently adjust the pH of the resulting solution to between about 3.0 and about 3.3. Monosodium glutamate is preferred for the pH adjustment. The acid is preferably added either all at once or within a period of about five seconds. When solutions containing higher concentrations of glutamic acid hydrochloride are employed, for example about 20%, rapid stirring should be started as soon as crystallization of monoclinic crystals begins and before the crystallization of the orthorhombic crystals starts. When more concentrated solutions, for example, solutions containing about 30% glutamic acid hydrochloride are employed, monoclinic crystals are obtained by adding about one-third of the required sodium hydroxide or monosodium glutamate, then rapid stirring is started and after monoclinic crystals appear the balance of the sodium hydroxide or monosodium glutamate is added.

The solutions may be combined at atmospheric temperatures or at higher temperatures, however, atmospheric temperature is preferred. For example, alkali or monosodium glutamate may be added to a 20% glutamic hydrochloride solution at an elevated temperature such as between about 50° C. and about 65° C. With stirring, crystallization starts in about one to one and one-half minutes and consists of monoclinic crystals. If monoclinic crystals only are desired, they should be filtered from the hot solution after a short crystallization period, for example, within about ten minutes, since when elevated temperatures are employed, a drop in temperature or an extended crystallization period results in crystallization of some orthorhombic crystals, and the product will contain a mixture of the two forms.

The glutamic acid which crytallizes under the above conditions comprises essentially the monoclinic type crystal. These crystals may be used as seed crystals in the production of the same type of crystal from additional amounts of monosodium glutamate-containing solution or from glutamic acid hydrochloride-containing solution. As previously stated the seed crystals may be employed in a slurry or may be separated from the liquor. Once a continuous process is put into operation, monoclinic crystals of glutamic acid furnish seed crystals when needed.

After seed crystals of monoclinic glutamic acid have originally been produced, a continuous process for the production of this type of crystal is established by preparing a slurry of monoclinic glutamic acid seed crystals in water, monosodium glutamate solution, or in glutamic acid hydrochloride solution, and while this slurry is being rapidly agitated, adding simultaneously and continuously the solution from which glutamic acid is to be crystallized and the solution which adjusts the pH of the mixture to between about 2.5 and about 4.0, preferably to between about 3.0 and about 3.3. It has been found that it is desirable to have the container in which this part of the continuous process takes place relatively small so that very efficient agitation is obtained and high supersaturations of glutamic acid may be established. When a relatively small sized container is employed, the necessity of having a large quantity of seed crystals to start with is avoided; a quantity equal to about 10% of the volume of the container is usually sufficient to insure successful operation at the start.

In one embodiment, the monosodium glutamate-containing solution and the nonoxidizing mineral acid are separately and continuously fed to the mixture in the required quantities in a small container to give a pH of between about 3.0 and about 3.3, and the resultant slurry is continuously removed, conducted or overflowed to a larger container in which further crystallization takes place. From this larger container the monoclinic glutamic acid crystals are continuously removed, filtered or centrifuged, and washed with water to remove water soluble impurities. Concentrations of monosodium glutamate solutions as high as between about 35% and about 40% may be used where seeding is employed, although larger crystals are obtained when the concentration of monosodium glutamate in solution is in the range between about 20% and about 30%.

In another embodiment of the instant invention a glutamic acid hydrochloride-containing solution and caustic soda or alternately a monosodium glutamate solution are separately and continuously fed to the slurry of monoclinic glutamic acid seed crystals in the required quantities to obtain a pH of between about 3.0 and about 3.3, and the resultant slurry is continuously removed to a larger container to crystallize monoclinic glutamic acid as described. Concentration of glutamic acid hydrochloride may vary to a considerable extent where seed crystals are present and concentrations as high as between about 30% and about 40% solutions may be used.

If the original crystals in the seed slurry comprise essentially the monoclinic type, the above continuous process produces an excellent yield of the metastable monoclinic crystals containing only traces of the stable orthorhombic crystals which may have been formed during the cooling step and during the time the adjusted mixture is held to obtain more complete crystallization. From the above description, it is obvious that in adjusting large batches of solution from which monoclinic glutamic acid is to be crystallized, the quantity of seed necessary to control production of the monoclinic type crystal is dependent upon the concentration of the solution to be adjusted, the rate of adjustment, type of agitation employed, and the size of the seed crystal.

In another embodiment of the instant invention monoclinic glutamic acid crystals are produced in a batch process. It is preferred to dilute a monosodium glutamate solution to about 10%, add monoclinic seed crystals thereto, if available, and then to adjust the pH to between about 3.0 and about 3.3 as previously described. The glutamic acid crystals obtained will comprise essentially the monoclinic type. Further additions of monosodium glutamate solution having a concentration between about 10% and about 40% may be added with acid either simultaneously or alternately and result in the formation of glutamic acid crystals predominately of the monoclinic type. The monoclinic glutamic acid crystals can be formed in a batch process from glutamic acid hydrochloride solution by admixing with sodium hydroxide or with monosodium glutamate solution. The concentration of the sodium hydroxide or of the monosodium glutamate solution may vary, however, it should not be so dilute that the adjusted mixture contains less than about 3% or about 4% monoclinic glutamic acid before crystallization. Generally between about 40% and about 50% caustic solutions or solutions containing between about 5% and about 15% monosodium glutamate are employed.

The following examples are given to afford a clearer understanding of the invention but are not intended as a limitation thereon.

Example I

For the original production of monoclinic glutamic acid crystals, which may be used as seed crystals, an approximately 10% monosodium glutamate solution was prepared from 10 grams of monosodium glutamate and 90 milliliters of water. While the solution was stirred rapidly with mechanical agitation, sufficient hydrochloric acid was added to the solution to adjust the pH to between about 3.0 and about 3.3. The acid was added to the solution within between about fifteen and about thirty seconds. Crystallization usually started within between about one-half and about one and one-half minutes after the final and completed pH adjustment. The stirring was continued for about two minutes after the start of crystallization and then discontinued. The crystallized glutamic acid was filtered off after at least about two or three hours and was thoroughly washed with water. The crystalline glutamic acid product was almost entirely monoclinic glutamic acid crystals.

Example II

Monoclinic glutamic acid was crystallized from and about 10% glutamic acid hydrochloride solution. The solution was stirred while sufficient 50% sodium hydroxide solution was added to adjust the pH to between about 3.0 and about 3.3. The caustic was added to the solution within between about three and about five seconds. Crystallization usually started within about thirty to about forty-five seconds after the completed pH adjustment. Stirring was continued for between about three and about five minutes after the start of crystallization. The crystallized glutamic acid was filtered and washed. The product was glutamic acid of the monoclinic type.

Example III

To an about 10% glutamic acid hydrochloride solution was rapidly added sufficient 10% monosodium glutamate solution to adjust the pH of the resulting solution to between about 3.0 and about 3.3. Stirring was begun and continued for between about three to about five minutes, and the crystals were filtered and washed. The product consisted of monoclinic crystals of glutamic acid.

Example IV

About 500 milliliters of an aqueous solution of between about 15% and about 25% monosodium glutamate was seeded with about 50 grams of monoclinic glutamic acid crystals produced as described in any of the previous examples.

The volume of hydrochloric acid required to adjust the pH of the solution to between about 3.0 and about 3.3 was added substantially instantaneously to the seeded slurry. The resultant slurry was vigorously agitated both during addition and for several minutes thereafter, cooled to room temperature or below, and allowed to crystallize for between about two and about five hours. The crystallized glutamic acid was filtered and washed with water. The glutamic acid produced was almost entirely monoclinic.

Monoclinic crystals of glutamic acid may also be produced from an aqueous slurry of between about 15% and about 25% monosodium glutamate which has been seeded with monoclinic crystals, as indicated above, by adding slowly during a period of between about five and about thirty minutes, the hydrochloric acid necessary to adjust the pH to between about 3.0 and about 3.3, the mixture being well stirred throughout the time required for the acid addition.

Example V

To about 200 grams of an about 10% glutamic acid hydrochloride solution was added about 1 gram of monoclinic glutamic acid seed crystals. While the mixture was vigorously agitated and before much of the seed crystals had dissolved, sufficient concentrated sodium hydroxide was added to adjust the pH to between about 3.0 and about 3.3. Crystallization occurred substantially immediately, and the crystals were filtered off within between about five to about ten minutes. The product was monoclinic glutamic acid.

With the use of seed crystals the concentration of the glutamic acid hydrochloride may vary over a wide range, and concentrations of between about 4% and about 40% may be employed.

A solution containing monosodium glutamate may be used in the adjustment of the pH of the glutamic acid hydrochloride solutions seeded with the monoclinic type crystals.

*Example VI*

Where monoclinic glutamic acid crystals were desired to be produced continuously, about 100 grams of the monoclinic crystals were slurried in about 500 milliliters of water and placed in a container holding 600 to 700 milliliters and equipped with an overflow. While the slurry in this container was being vigorously agitated, aqueous monosodium glutamate solution of between about 20% and about 25% concentration was run into the container at a rate of approximately 500 milliliters per minute, and at the same time through a separate inlet the quantity of hydrochloric acid required to maintain the pH at between about 3.0 and about 3.3 within the container was also run in. The inlets for the monosodium glutamate solution and for the acid were separated from each other. During the continuous addition of the monosodium glutamate and of the acid, a continuous discharge of a slurry of crystallized glutamic acid takes place through the overflow. This discharge may be filtered immediately or cooled and held, without stirring, for between about one to about four days before filtering, if a greater yield is desired. The crystalline glutamic acid after filtering and washing in the usual manner, was essentially the metastable monoclinic crystals.

*Example VII*

The stable orthorhombic crystals of glutamic acid were produced by adjusting the pH of 500 milliliters of a 20% monosodium glutamate solution to between about 3.0 and about 3.3 by slowly adding, over a period of four to five minutes, the necessary volume of concentrated hydrochloric acid with slow agitation, as contrasted with the lower concentration of monosodium glutamate solution and rapid acid addition set forth in Examples I, II and III.

The orthorhombic crystals may also be obtained by the methods used in Examples IV and V provided that the stable orthorhombic crystals are used as seed instead of the metastable monoclinic crystals.

*Example VIII*

To produce originally a mixture of both the stable orthorhombic crystals and the metastable monoclinic crystals of glutamic acid, hydrochloric acid is added to about 200 milliliters of a 20% monosodium glutamate solution in sufficient quantity to adjust the pH to between about 3.0 and about 3.3. The acid addition is made with agitation and within between about ten and about fifteen seconds, and the resultant solution is stirred for only about one second, to give mostly monoclinic crystals, and then allowed to stand without agitation for ten to fifteen minutes to induce orthorhombic crystal formation; the crystalline glutamic acid thus produced is a mixture of the two crystalline forms.

Having thus fully described the invention, what is desired to be secured by Letters Patent is:

1. A process for the crystallization of monoclinic glutamic acid crystals which comprises adjusting the pH of an aqueous solution containing a composition selected from the group consisting of mineral acid and glutamic acid mineral acid addition salt by admixing therewith an aqueous solution containing a composition selected from the group consisting of inorganic oxygen-containing alkaline compounds and monosodium glutamate, wherein the adjusted solution contains glutamic acid at a pH between about 2.5 and about 4.0, said solution being adjusted rapidly and with agitation and said aqueous glutamic acid solution containing from the commencement of the said pH adjustment up to about thirty seconds after the completion of said pH adjustment, at least one crystal nucleus of monoclinic glutamic acid, and separating monoclinic glutamic acid crystals from the resulting crystal containing slurry.

2. A process for the production of monoclinic glutamic acid crystals which comprises adjusting the pH of an aqueous solution selected from the group consisting of a solution of hydrolyzed glutamic acid mother substance having a concentration of between about 5% and about 40% of a glutamic acid salt and containing at least one monoclinic glutamic acid seed crystal, and a solution comprising hydrolyzed glutamic acid mother substance having a concentration of between about 5% and about 25% of a glutamic acid salt, with sufficient reagent nonoxidizing under the conditions obtaining to obtain a pH of between about 2.5 and about 4.0, said reagent being added rapidly with agitation and said aqueous solution containing from the commencement of said pH adjustment up to about thirty seconds after the completion of said pH adjustment at least one crystal nucleus of monoclinic glutamic acid, and separating monoclinic glutamic acid crystals from the resulting crystal-containing slurry.

3. A process for the production of monoclinic glutamic acid crystals which comprises crystallizing monoclinic glutamic acid crystals from an aqueous solution initially containing between about 5% and about 40% monosodium glutamate, admixing therewith sufficient nonoxidizing mineral acid to adjust the pH of said admixture to between about 2.5 and about 4.0, said solution containing from the commencement of said pH adjustment up to about thirty seconds after the completion of said pH adjustment at least one monoclinic glutamic acid crystal nucleus, and recovering monoclinic glutamic acid crystals from the resultant crystal-containing slurry.

4. A process for the production of monoclinic glutamic acid crystals which comprises adding to an aqueous solution of monosodium glutamate of between about 5% and about 15% strength sufficient nonoxidizing mineral acid to adjust the pH of the aforesaid solution to between about 2.5 and about 4.0, all of the required amount of the acid being added with agitation within between about ten and about thirty seconds, and recovering from the acidulated solution, after crystallization, monoclinic glutamic acid crystals.

5. A process for the production of monoclinic glutamic acid crystals which comprises crystallizing monoclinic glutamic acid crystals from an aqueous solution initially containing between about 4% and about 40% glutamic acid hydrochloride, admixing therewith sufficient reagent selected from the group consisting of sodium hydroxide and monosodium glutamate to adjust the pH of said mixture to between about 2.5 and about 4.0, said solution containing from the commencement of the pH adjustment up to about thirty seconds after the completion of said adjustment at least one monoclinic glutamic acid crystal nucleus, and recovering monoclinic glutamic acid crystals from the resultant crystal containing slurry.

6. A process for the production of monoclinic glutamic acid crystals which comprises adding to an aqueous solution of glutamic acid hydrochloride of between about 4% and about 20% strength sufficient reagent selected from the group consisting of sodium hydroxide solutions and monosodium glutamate solutions to adjust the pH of the aforesaid solution to between about 2.5 and about 4.0, all of the required amount of reagent being added with agitation within about ten seconds, and recovering from the resulting mixture monoclinic glutamic acid crystals.

7. A process for the production of crystalline glutamic acid which comprises adjusting an aqueous solution of between about 5% and about 15% strength of monosodium glutamate to a pH of between about 3.0 and about 3.3 with concentrated hydrochloric acid, all of the required amount of the acid being added with agitation within about thirty seconds, and recovering from the resultant acidulated solution, after crystallization, monoclinic glutamic acid crystals.

8. A process for the production of monoclinic glutamic acid crystals which comprises combining substantially simultaneously with agitation a solution of between about 5% and about 15% monosodium glutamate with the volume of nonoxidizing mineral acid necessary to adjust the pH of the resultant solution to between about 2.5 and about 4.0, agitating and cooling the solution to room temperature until crystallization takes place, and separating therefrom a product comprising essentially monoclinic glutamic acid crystals having linear axial constants of $$a:b:c = 0.703:1:1.422$$
$$\beta = 110°51'.$$

9. A process for the production of monoclinic glutamic acid crystals which comprises combining substantially simultaneously with agitation an about 10% aqueous monosodium glutamate solution with the volume of concentrated hydrochloric acid necessary to adjust the pH of the solution to between about 2.5 and about 4.0, and separating from the resultant solution, after crystallization, a product comprising essentially monoclinic glutamic acid crystals having linear axial constants of $$a:b:c = 0.703:1:1.422, \beta = 110°51'$$

10. A process for the production of monoclinic glutamic acid crystals which comprises adjusting an aqueous solution of between about 4% and about 20% strength of glutamic acid hydrochloride to a pH of between about 2.5 and about 4.0 with a solution containing between about 10% and about 15% monosodium glutamate all of the required amount of the monosodium glutamate solution being added with agitation within about ten seconds, and recovering from the resultant solution after crystallization monoclinic glutamic acid crystals.

11. A process for the production of monoclinic glutamic acid crystals which comprises combining substantially simultaneously with agitation a solution of between about 4% and about 20% glutamic acid hydrochloride with the volume of reagent selected from the group consisting of sodium hydroxide solution and monosodium glutamate solution necessary to adjust the pH of the solution to between about 3.0 and about 3.3, agitating the solution until crystallization occurs, and separating therefrom a product comprising essentially monoclinic glutamic acid crystals.

12. A process for the production of monoclinic glutamic acid crystals which comprises combining substantially simultaneously with agitation aqueous glutamic acid hydrochloride solution having a strength of between about 4% and about 20% with the volume of monosodium glutamate solution necessary to adjust the pH of the resulting solution to between about 2.5 and about 4.0, and separating from the resultant solution after crystallization a product comprising essentially monoclinic glutamic acid crystals.

13. A process for the production of monoclinic glutamic acid crystals, which comprises seeding an aqueous solution containing between about 5% and about 20% monosodium glutamate with monoclinic glutamic acid crystals, adding to the resultant mixture with agitation the volume of concentrated hydrochloric acid required to adjust the pH of said mixture to between about 2.5 and about 4.0, and separating, after crystallization, a product comprising essentially monoclinic glutamic acid crystals having linear axial constants of $a:b:c = 0.703:1:1.422$, $\beta = 110°51'$.

14. A process for the production of monoclinic glutamic acid crystals which comprises seeding an aqueous solution containing between about 5% and about 40% monosodium glutamate with monoclinic glutamic acid crystals, admixing sufficient nonoxidizing mineral acid therewith to give a pH of between about 2.5 and about 4.0, crystallizing therein monoclinic glutamic acid crystals, and recovering said crystals from the resultant crystal-containing slurry.

15. A process for the production of monoclinic glutamic acid crystals which comprises seeding an aqueous solution containing between about 5% and about 40% glutamic acid hydrochloride with monoclinic glutamic acid crystals, adding to the resultant mixture with agitation the volume of reagent selected from the group consisting of sodium hydroxide solution and monosodium glutamate solution required to adjust the pH of said mixture to between about 2.5 and about 4.0, and separating, after crystallization, a product comprising essentially monoclinic glutamic acid crystals.

16. A continuous process for the production of monoclinic glutamic acid crystals which comprises preparing in a container a slurry of monoclinic crystals of glutamic acid, adding continuously to said slurry proportioned quantities of an aqueous monosodium glutamate solution of between about 5% and about 40% strength and nonoxidizing mineral acid in such amounts as to maintain the pH of the contents of said container between about 2.5 and about 4.0 while continuously discharging the resultant slurry from said container, and recovering therefrom monoclinic glutamic acid crystals.

17. A continuous process for the production of monoclinic glutamic acid crystals which comprises preparing in a container a slurry of monoclinic crystals of glutamic acid adding continuously to said slurry proportioned quantities of an aqueous glutamic acid hydrochloride solution of between about 4% and about 40% strength and reagent selected from the group consisting of sodium hydroxide solution and monosodium glutamate solution in sufficient amounts to maintain the pH of the contents of said container between about 2.5 and about 4.0 while continuously discharging the resultant slurry, and recovering therefrom monoclinic glutamic acid crystals.

18. A continuous process for the production of monoclinic glutamic acid crystals which comprises adjusting an aqueous solution of monosodium glutamate having a strength of between about 5% and about 40% to a pH of between about 2.5 and about 4.0, said adjustment being made with hydrochloric acid with agitation and within about thirty seconds; adding continuously and separately to the resultant slurry quantities of an aqueous solution of monosodium glutamate and concentrated hydrochloric acid in such amounts to maintain the pH of the contents of said container to between about 2.5 and about 4.0, continuously discharging the resultant slurry from said container, and recovering therefrom monoclinic glutamic acid crystals.

19. A continuous process for the production of monoclinic glutamic acid crystals which comprises adjusting an aqueous solution of glutamic acid hydrochloride having a strength of between about 5% and about 20% to a pH of between about 2.5 and about 4.0, said adjustment being made with a reagent selected from a group consisting of sodium hydroxide solution and monosodium glutamate solution with agitation and within about five seconds; adding continuously and separately to the resultant slurry quantities of an aqueous glutamic acid hydrochloride solution and reagent selected from the group consisting of sodium hydroxide solution and monosodium glutamate solution, in sufficient amounts to maintain the pH of the contents of said container between about 2.5 and about 4.0, continuously discharging the resultant slurry from said container, and recovering therefrom monoclinic glutamic acid crystals.

20. A continuous process for the production of crystalline glutamic acid which comprises combining substantially simultaneously in a container a solution of monosodium glutamate with the volume of concentrated hydrochloric acid necessary to adjust the pH to between about 2.5 and about 4.0, agitating and cooling the solution to room temperature, adding to the resulting slurry quantities of monosodium glutamate and concentrated hydrochloric acid in such amounts as to maintain the pH of the contents of said container between about 2.5 and about 4.0, continuously discharging the resultant slurry from said container, and obtaining from said slurry a product comprising essentially crystalline glutamic acid which is monoclinic with linear axial constants of $$a:b:c = 0.703:1:1.422$$

$$\beta = 110°51'.$$

21. In a process involving the hydrolysis with alkali of concentrated Steffen's filtrate, cooling the hydrolysate, adjusting the cooled hydrolysate to a pH of between about 5.0 and about 5.4, crystallizing and separating inorganic salts from the adjusted mixture, the improvements comprising admixing the solution from which inorganic salts have been removed with sufficient hydrochloric acid to adjust the pH to between about 3.0 and about 3.3 all of the required amount of the acid being added with agitation within and about thirty seconds, and recovering from the resultant acidulated solution, after crystallization, monoclinic glutamic acid crystals.

22. In a process involving the hydrolysis with alkali of concentrated Steffen's filtrate, cooling the hydrolysate, adjusting the cooled hydrolysate to a pH of between about 5.0 and about 5.4, crystallizing and separating inorganic salts from the adjusted mixture, the improvements comprising seeding the solution from which inorganic salts have been removed with monoclinic glutamic acid, admixing the resulting slurry with sufficient hydrochloric acid to adjust the pH to between about 3.0 and about 3.3 all of the required amount of the acid being added with agitation, and recovering from the resultant acidulated mixture, after crystallization, monoclinic glutamic acid crystals.

23. In a continuous process involving the hydrolysis with alkali of concentrated Steffen's filtrate, crystallizing and separating inorganic salts from the hydrolysate at a pH between about 5.0 and about 5.4, adjusting the pH of the resulting solution with hydrochloric acid to between about 3.0 and about 3.3, crystallizing and separating crude glutamic acid from the adjusted mixture, dissolving the crude glutamic acid, adjusting the pH of the resulting slurry to between about 6.0 and about 6.5, decolorizing and separating solid material from the resulting solution, mixing therewith sufficient concentrated hydrochloric acid to adjust the pH of the solution to between about 3.0 and about 3.3 and crystallizing refined glutamic acid therefrom, the improvements comprising adjusting the pH of the several solutions from which the crude and the refined glutamic acid is to be crystallized to between about 3.0 and about 3.3 with hydrochloric acid, all of the required acid being added with agitation to said solutions in the respective containers, said solutions containing from the commencement of said pH adjustments up to about thirty seconds after the completion of said pH adjustments at least one monoclinic glutamic acid crystal nucleus, adding to the resulting slurries quantities of monosodium glutamate and concentrated hydrochloric acid in such amounts as to maintain the pH of the contents of said containers at a pH between about 2.5 and about 4.0 while continuously discharging the resulting slurries from said containers, and recovering from the resulting mixtures, after crystallization, monoclinic glutamic acid crystals.

References Cited in the file of this patent

UNITED STATES PATENTS

| Number | Name | Date |
| --- | --- | --- |
| 2,517,601 | Shafor et al. | Aug. 8, 1950 |